US008627009B2

(12) United States Patent
Mekhiel

(10) Patent No.: US 8,627,009 B2
(45) Date of Patent: Jan. 7, 2014

(54) CACHE FILTERING METHOD AND APPARATUS

(75) Inventor: Nagi Nassief Mekhiel, Markham (CA)

(73) Assignee: Mosaid Technologies Incorporated, Ottawa (CA)

( * ) Notice: Subject to any disclaimer, the term of this patent is extended or adjusted under 35 U.S.C. 154(b) by 937 days.

(21) Appl. No.: 12/211,159

(22) Filed: Sep. 16, 2008

(65) Prior Publication Data

US 2010/0070709 A1    Mar. 18, 2010

(51) Int. Cl.
*G06F 12/00* (2006.01)

(52) U.S. Cl.
USPC .................... 711/122; 711/E12.052; 711/138

(58) Field of Classification Search
USPC ......................................................... 711/122
See application file for complete search history.

(56) References Cited

U.S. PATENT DOCUMENTS

| | | | |
|---|---|---|---|
| 5,625,793 A | 4/1997 | Mirza | |
| 6,769,047 B2 | 7/2004 | Kurupati | |
| 6,804,750 B2 | 10/2004 | LaBerge | |
| 7,149,850 B2 | 12/2006 | Minami | |
| 7,325,102 B1 * | 1/2008 | Cypher | 711/146 |
| 7,596,661 B2 * | 9/2009 | Hsu et al. | 711/122 |
| 2006/0112233 A1 * | 5/2006 | Hu et al. | 711/138 |

OTHER PUBLICATIONS

Johnson, Teresa et al, "Run-time Adaptive Cache Hierarchy Management via Reference Analysis," Proceedings of the 24th Annual International Symposium on Computer Architecture, (ISCA 1997), vol. 25, Issue 2 (May 1997).
Mekhiel, Nagi, "LHA: Latency Hiding Algorithm for DRAM," 2nd Annual Workshop on Memory Performance Issues (WMPI 2002), Mar. 2002.
PCT/CA2009/001169, International Search Report, 3 pages, Nov. 24, 2009.
Mowry, Todd et al., Design and Evaluation of a Compiler Algorithm for Prefetching, Computer Systems Laboratory, Stanford University, CA (1992).
Gonzalez, Antonio, et al., A Data Cache with Multiple Caching Strategies Tuned to Different Types of Locality, Universitat Politecnica de Catalunya, Departmento de Arquitetura de Computadores, Barcelona, Spain (1995).
Saulsbury, Ashley, et al., Missing the Memory Wall: the Case for Processor/Memory Integration, Sun Microsystems Computer Corporation, Swedish Institute of Computer Science (1996).
Ranganathan, Parthasarathy, et al., The Interaction of Software Prefetching with ILP Processors in Shared-Memory Systems, Department of Electrical and Computer Engineering, Rice University, Houston, TX (1997).

(Continued)

*Primary Examiner* — Manorama Padmanabhan
*Assistant Examiner* — Hamdy S Ahmed
(74) *Attorney, Agent, or Firm* — Dennis R. Haszko

(57) ABSTRACT

A method and apparatus used within memory and data processing that reduces the number of references allowed in processor cache by using active rows to reject references that are less frequently used from the cache. Comparators within a memory controller are used to generate a signal indicative of a row hit or miss, which signal is then applied to one or more demultiplexers to enable or disable transfer of a memory reference to processor cache locations. The cache may be level one (L1) or level two (L2) caches including data and or instructions or some combination of L1, L2, data, and instructions.

16 Claims, 20 Drawing Sheets

(56) References Cited

OTHER PUBLICATIONS

Mekhiel, Nagi, The Effect of an Intercepting Cache on Performance of Fast Page and Cache DRAM, Department of Electrical and Computer Engineering, Ryerson Polytechnic University, Toronto, Ontario (1998).

Sanchez, Jesus, et al., A Locality Sensitive Multi-Module Cache with Explicit Management, Universitat Politecnica de Catalunya, Department of Computer Architecture, Barcelona, Spain (1999).

Truong, Dan N., et al., Improving Cache Behavior of Dynamically Allocated Data Structures, IRISA—INRIA, Campus de Beaulieu, Rennes, CEDEX, France (1998).

Mutlu, Onur, et al., Cache Filtering Techniques to Reduce the Negative Impact of Useless Spectulative Memory References on Processor Performance, Department of Electrical and Computer Engineering, The University of Texas at Austin (2004).

Mekhiel, Nagi, Multi-Level Cache with Most Frequently Used Policy: a New Concept in Cache Design, Department of Electrical and Computer Engineering, Ryerson Polytechnic University, Toronto, Ontario (1995).

Tomasko, Michelle, et al., Colorado State University, Computer Science Technical Report, Fort Collins, CO (1997).

* cited by examiner

CACHE FILTERING METHOD AND APPARATUS

TECHNICAL FIELD

The present invention relates generally to memory and processing. More particularly, the present invention relates to a method and apparatus for cache filtering.

BACKGROUND

Within the art of computer processing and memory systems in particular, the speed gap between processor and main memory has grown. This gap directly impacts the performance of overall computing systems. To alleviate performance concerns, computing systems include a cache mechanism upon which they depend to bridge this speed gap. The success of such cache mechanisms in bridging this speed gap varies with parameters such as size, block size, and associativity. However, such cache mechanisms cannot continuously improve performance by changing these parameters because in doing so there is reached a point of diminishing returns due increasing system complexity, power consumption and the behavior of the cache itself.

Existing caching mechanisms generally depend upon spatial and temporal localities of references in order for the caching to be effective. However, some situations such as multimedia applications have limited localities and are more dependent on the performance of main memory. Also, applications that are written in C, C++, and Object Oriented Programming use dynamically allocated data structures to map data to available memory space. As such data could be scattered in memory and therefore lack spatial locality. Data elements in these applications might not be reused soon enough in time and thus also lack temporal locality. The lack of spatial and temporal locality in these types of computing applications makes conventional cache mechanisms less effective.

Within memory systems, a reference that lacks spatial and temporal locality but is used many times is more important to keep in cache than a reference that is captured in cache but never used again. Cached references that are not used again are undesirable because they compete with the other more frequently used references. As well, references that have poor spatial and temporal locality but are rich in their frequency of use must not be removed or replaced.

Improvements to such cache mechanisms have generally been achieved by utilizing the locality of references that might not exist in some applications. Most often, this is accomplished with the added cost of extra hardware to keep more references in cache by increasing the size or associativity of cache, providing extra levels of memory hierarchy, or providing pre-fetching buffers.

Accordingly, cache mechanisms have become less efficient due to the growing gap between processor speed and main memory speed and the lack of localities in some applications. To deal with cache limitations and the continuous increase in cache miss penalty, hardware and software pre-fetching schemes have been used to fetch the data from the main memory in advance, before the data is needed. While such pre-fetching methods are useful for regular access patterns found in some applications, such methods cannot hide very long cache miss latencies which may extend to hundreds of cycles in modern and future processors.

Other methods have been proposed to better manage primary memory cache (i.e., level 1 or L1 cache) through selective allocation. These selective allocation schemes statically partition the cache so that cache blocks are allocated in different sub-caches based upon their spatial and temporal localities. However, these methods are problematic in that they may perform poorly if the access patterns do not suit the partitioning.

Other methods have been proposed which employ the frequency of use of references in a multi-level cache so as to move the most frequently used references to a higher level cache in order to improve L1 cache performance. However, this approach is suitable for systems with a small L1 cache, becoming less effective when L1 cache size and associativity increases.

Still other methods have been proposed using the first level cache as a filter so as to bring useful speculative memory references to first level cache. However, this approach yields limited performance improvements and disadvantageously increases hardware cost in order to predict the usefulness of references.

It is, therefore, desirable to provide a cache mechanism that bridges the speed gap between modern memory systems and computer processors in a cost-effective manner that does not rely upon costly additional hardware and can handle large memory caches.

SUMMARY

It is an object of the present invention to obviate or mitigate at least one disadvantage of previous cache mechanisms.

It has been herein recognized by analysis of the behavior of memory references that there are few references that are used many times and many references that are never used more than one time. Moreover, it has been found that the number of addresses that are used two or more times are roughly half the number of addresses that are used one or more times. This means that half of the addresses that are transferred to conventional cache are never used. They are transferred to the cache from the main memory using valuable processor and memory bus time. Furthermore, the references that are never used in cache compete with the references that are frequently used and could displace them. It is therefore useful to keep in cache references that are used more frequently and reject less frequently used references.

In general, embodiments of the present invention provide for dynamic management of the cache by monitoring the behavior of references to DRAM open rows. Data in DRAM is not affected by the processor's pre-fetching schemes or caching. When having data in caches, their localities change because only a limited size of data are transferred to the cache at a given time. Existing schemes that use the behavior of data in caches are influenced by the processor and are limited in their scope to the cache localities. Accordingly, it becomes evident that cache limitations cannot be cured from the cache itself, but rather one must look outside the cache. Embodiments of the present invention provide a new approach to improve cache performance without increasing system complexity. This is made possible by utilizing the behavior of references and their frequency of use in main memory.

Embodiments of the present invention provide for rejection of addresses that are used once, thereby reducing cache conflicts and evictions of useful blocks. Miss penalty is also reduced due to the reduction in transfer time of the whole cache block for rejected references. Embodiments of the present invention provide for transfer of one word to the processor register if it rejects the reference from the cache. In a typical multi core chip, the demand for memory bus utilization increases and limits system scalability. Embodiments of the present invention provide for reduction of bus utilization by eliminating the transfer of long cache blocks to processor for references that are used only once.

In a first aspect, the present invention provides a method of cache filtering, the method including: upon a cache miss, obtaining a row hit/miss signal for a given memory reference; and rejecting the memory reference associated with the row hit/miss signal when the row hit/miss signal indicates a row miss.

In a further embodiment, there is provided a method of cache filtering within a Dynamic Random Access Memory (DRAM), the method including: generating a row hit/miss signal corresponding to a memory reference; and upon occurrence of level one (L1) and level two (L2) cache misses and where the row hit/miss signal indicates a row miss, accessing data in the DRAM and latching a row address in a corresponding row latch.

In a further embodiment, the present invention provides an apparatus for data processing, the apparatus including: a memory having a plurality of locations; a memory controller coupled to the memory, the memory controller including at least one comparator for generating a row hit/miss signal corresponding to a memory reference related to one of the plurality of locations; and at least one demultiplexer operatively coupled to the memory controller where the row hit/miss signal is used by the demultiplexer so as to route data related to the memory reference; and row latches for latching a row corresponding to the data.

In a further embodiment, there is provided a method of cache filtering within a Static Random Access Memory (SRAM), the method including: generating a row hit/miss signal corresponding to a memory reference; and upon occurrence of level one (L1) and level two (L2) cache misses and where the row hit/miss signal indicates a row miss, accessing data in the SRAM using random access mode and latching a row corresponding to the data.

Other aspects and features of the present invention will become apparent to those ordinarily skilled in the art upon review of the following description of example embodiments of the invention in conjunction with the accompanying figures.

BRIEF DESCRIPTION OF THE DRAWINGS

Embodiments of the present invention will now be described, by way of example only, with reference to the attached Figures.

DETAILED DESCRIPTION

Embodiments of the present invention provide a cache filtering method and apparatus that improves performance by using, in an illustrative embodiment, Dynamic Random Access Memory (DRAM) active rows to reject references that are less frequently used from cache without increasing system complexity.

The present cache filter method and apparatus assumes a DRAM based memory system, however it should be understood that one could also use Static Random Access Memory (SRAM) or any other type of suitable storage without straying from the intended scope of at least some embodiments of the present invention.

The following example, described with regard to the figures, is given to explain and illustrate one embodiment in accordance with the present invention and is detailed in terms of a conventional DRAM-based main memory system utilizing the present invention.

Figure 1:
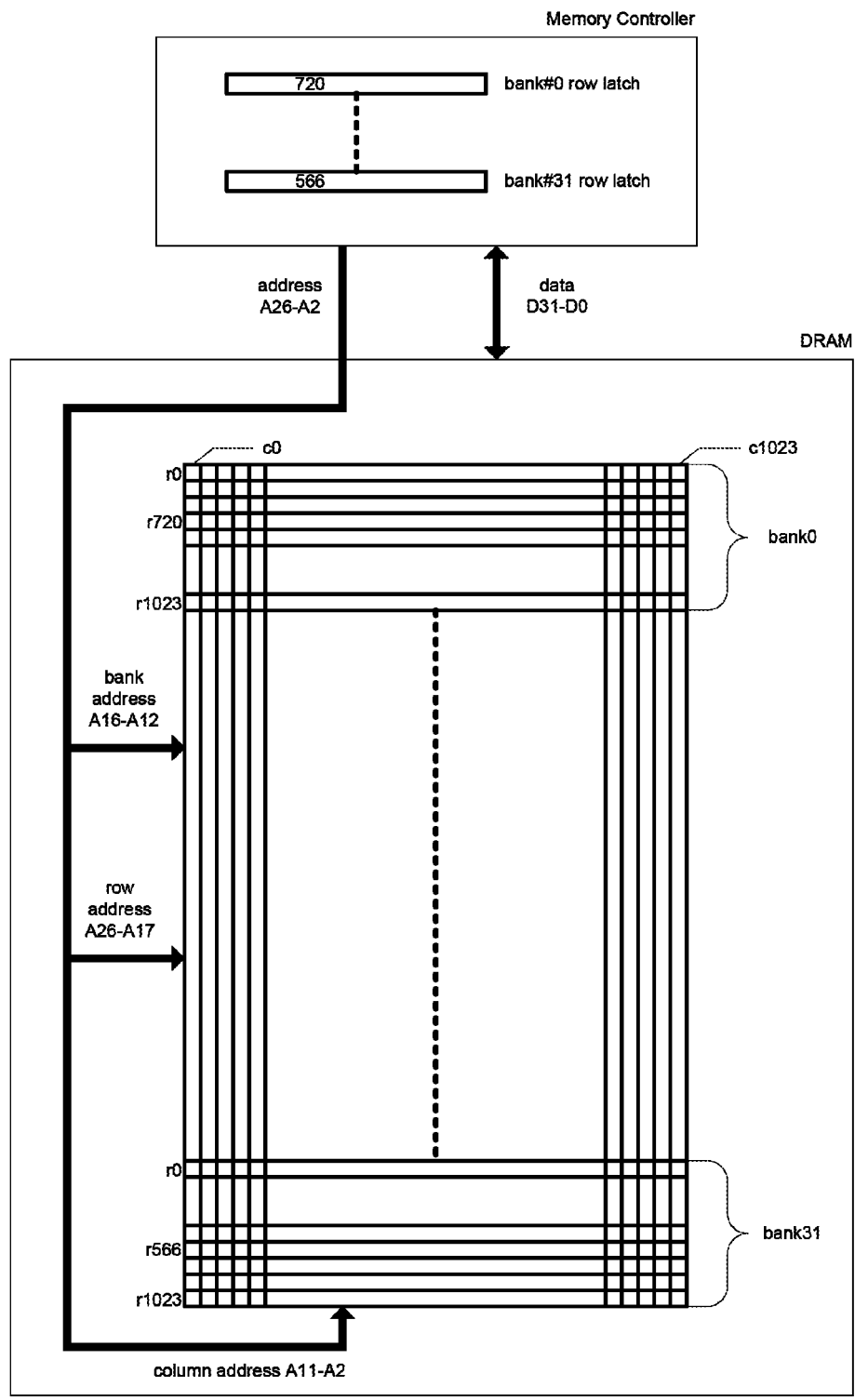
FIG. 1 is a block diagram illustrating a Dynamic Random Access Memory (DRAM) and row latches within a DRAM controller used in conjunction with an embodiment of the present invention.

FIG. 1 shows a block diagram for a DRAM and row latches within a DRAM controller. The DRAM assumes using a multi-bank system that consists of 32 banks shown as bank0 through bank31. Each bank has 1024 rows (i.e., r0 through r1023) and each row has 1024 columns (i.e., c0 through r1023). Total DRAM storage is 32 M words. Each word is assumed to be 4 Byte such that the total DRAM size=128 MB. The processor address (A26-A0) is used to access any byte in the 128 MB storage.

The processor address is used to select a single location in terms of bank, row, column, and byte selections. Bank select involves address A16-A12 being used to select one bank out of 32 banks. Row select involves address A26-A17 being used to select one row in the accessed bank out of 1024 rows. Each bank is allowed to keep one row active at a time if open page policy is used. It is important to note that the cache filtering in accordance with embodiments of the present invention can use a closed page policy by storing the most recently accessed row of each bank in the DRAM controller's row latches. Row720 is assumed to be accessed in bank0, and row566 is assumed to be accessed in bank31. Column select involves address A11-A2 being used to select one column out of 1024 in the accessed row. Byte select involves address A1-A0 being used to select one Byte out of a 4 Byte word in the accessed Column and Row.

As is typical of most cache mechanisms, embodiments of the present invention use an Open Page (OP) policy to exploit faster column access in DRAM. One active row should be latched in each bank. The number of latches needed is therefore equal to 32. Each latch stores 10 bits of address (A26-A17) each time a row is activated in DRAM. These latches are implemented in the DRAM controller. In this example, the first row latch stores the address of the active row in bank0 which is 720. The last row latch stores the address of the active row in bank31 which is 566. These inputs to these latches are all connected to the processor address A26-A17. Each row latch is clocked by a decoded RAS signal corresponding to each DRAM bank to latch a specific row address. These RAS signals act as a clock signal allowing each latch to store its accessed row when the row becomes active as in any conventional open page DRAM design.

Figure 2:
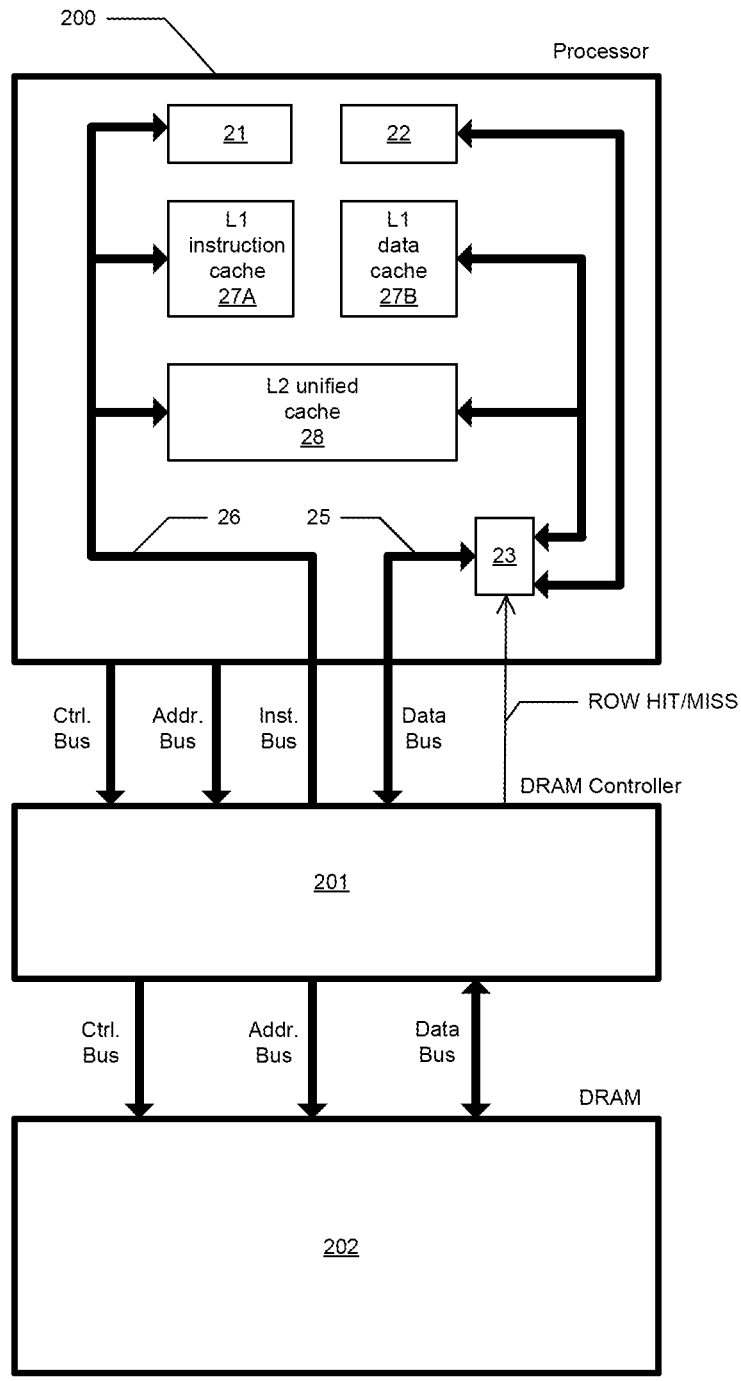
FIG. 2 is a block diagram for a system including a processor, DRAM, and DRAM controller and illustrating an embodiment of the present invention.

FIG. 2 shows a block diagram for a system using the present invention. Referring to FIG. 2, a processor 200 includes level 1 (L1) caches 27A, 27B and level 2 (L2) cache 28. The L2 cache 28 is a unified cache. The L1 cache 27A is a portion for instructions receiving information via an instruction bus 26 and the cache 27B is a portion for data receiving information via a data bus 25. The instruction bus 26 is in communication with an instruction register 21. A multi-bank DRAM 202 is used with open page policy. DRAM banks are page interleaved to increase row hit rate. A DRAM controller 201 receives memory requests from the processor 200 and generates Column Address Strobe (CAS) and Row Address Strobe (RAS) signals to access DRAM 202. The DRAM controller 201 compares the row address of the current memory request to the addresses of the latched active rows and gives a row hit indication if there is a match. The first access to a location in DRAM 202 generates a row miss indication. The DRAM controller 201 then latches the accessed row to keep it active. If the next access to the same memory bank is to the same address, there will be a row hit.

In general, embodiments of the present invention use the row hit signal to determine via comparators whether the DRAM reference has been used before. If the row comparator signal is a miss then this is either the first access to such location in DRAM or this row has been deactivated due to such location not being used or an intervening access to another location. If the row comparator signal is a hit, embodiments of the present invention allow the transfer of referenced data to the L1 and L2 caches and embodiments of the present invention reduce the number of references allowed in cache by rejecting references that generate row misses. This reduces the transfer time of data to the processor because, in a row miss, only one word is transferred to a register file 22. By contrast, the whole block is transferred to the cache on both row hit and row miss in a conventional cache.

Figure 3:
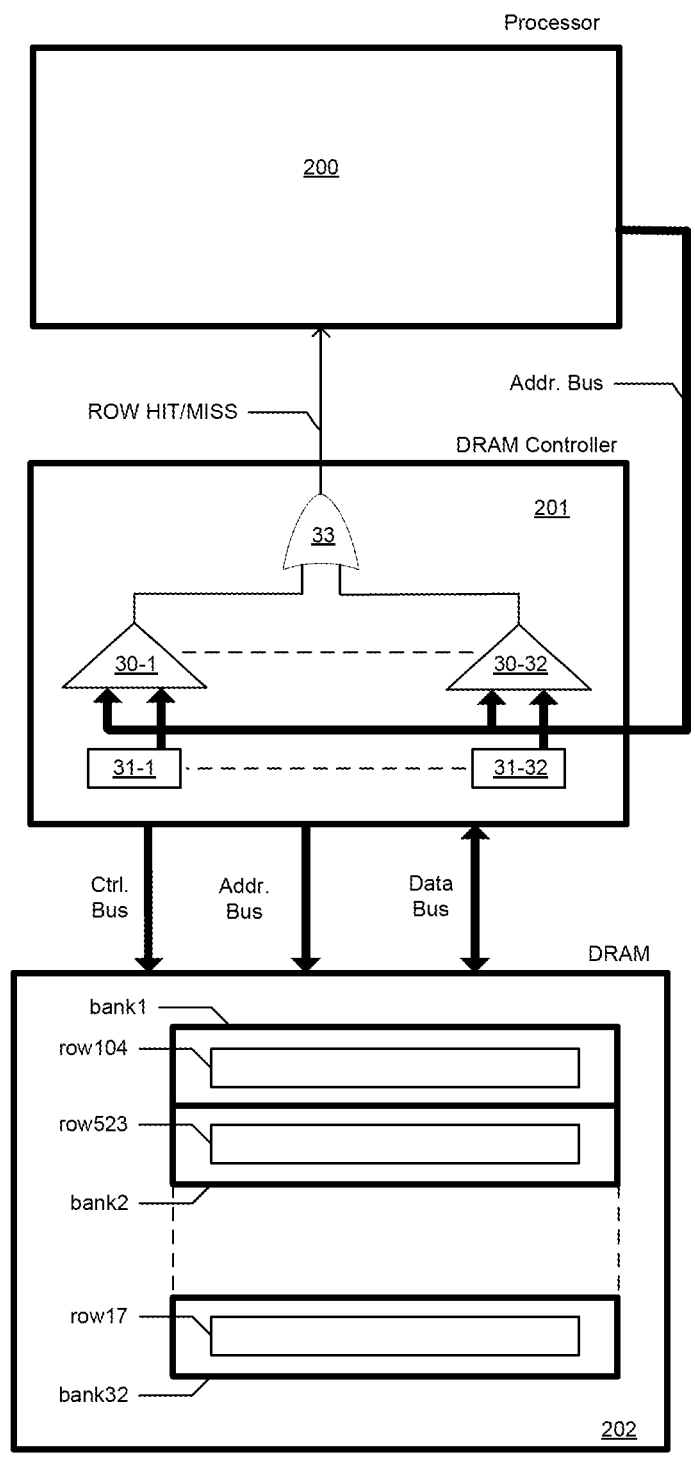
FIG. 3 is a block diagram in accordance with an embodiment of the present invention with regard to the DRAM controller as seen in FIG. 2.

FIG. 3 shows a block diagram detailing the comparator use mentioned above and with specific regard to the DRAM controller 201, processor 200, and DRAM 202 seen in FIG. 2. Here, the DRAM controller 201 is shown with row latches including bank0 row latch 31-1 through bank31 row latch 31-32. The row latches are used to latch the active rows of the accessed bank as mentioned above. Embodiments of the present invention also use row comparators 30-1 through 30-32—one for each row latch 31-1 through 31-32—to compare the current processor address to the latched row for the accessed bank in DRAM 202 so as to determine whether the current processor access is in an active row. Only the output of the comparator for the current accessed bank is considered. Other comparator outputs are disabled with a bank address decoder (not shown). The comparators 30-1 through 30-32 provide outputs signals representing determination results. In response to the comparator output signals, an OR gate 33 outputs a ROW HIT/MISS signal that is=1 if there is a row hit (i.e., a match between processor address A26-A17 and the latched row) in the accessed bank. The comparators 30-1 through 30-32 compare bits A26-A17 of the processor's address to the latched row for the accessed bank. If the current processor row address does not match the latched row, then comparator 33 outputs ROW HIT/MISS=0 thus indicating a miss. The DRAM controller 201 thus latches the current accessed row in the latch of the corresponding bank for next possible access to same row.

The DRAM controller 201 also provides the processor 200 with the ROW HIT/MISS signal to decide whether to accept or reject the current memory reference to processor caches as required by the cache filtering method and apparatus in accordance with embodiments of the present invention. The DRAM controller 201 uses the processor address and control signals to generate the proper row address, column address and the rest of control signals (e.g., RAS, CAS, . . . etc) for the DRAM 202 to be accessed as in any conventional system.

With further regard to FIG. 2, the processor 200 examines the ROW HIT/MISS signal 24 generated from the DRAM controller 201 and uses a de-multiplexer 23 to route the data to the caches or the register file 22. The processor 200 also adjusts the timing needed for the data transfer to satisfy the size of data transfer. The processor 200 transfers a cache block, which normally consists of multiple words, and needs multiple processor bus cycles if the data is accepted in the cache as in any conventional system. If the reference from the DRAM 202 is rejected because it is less frequently used, then the processor needs only one cycle to transfer one word directly to the register file 22 in accordance with embodiments of the present invention.

Figure 4:
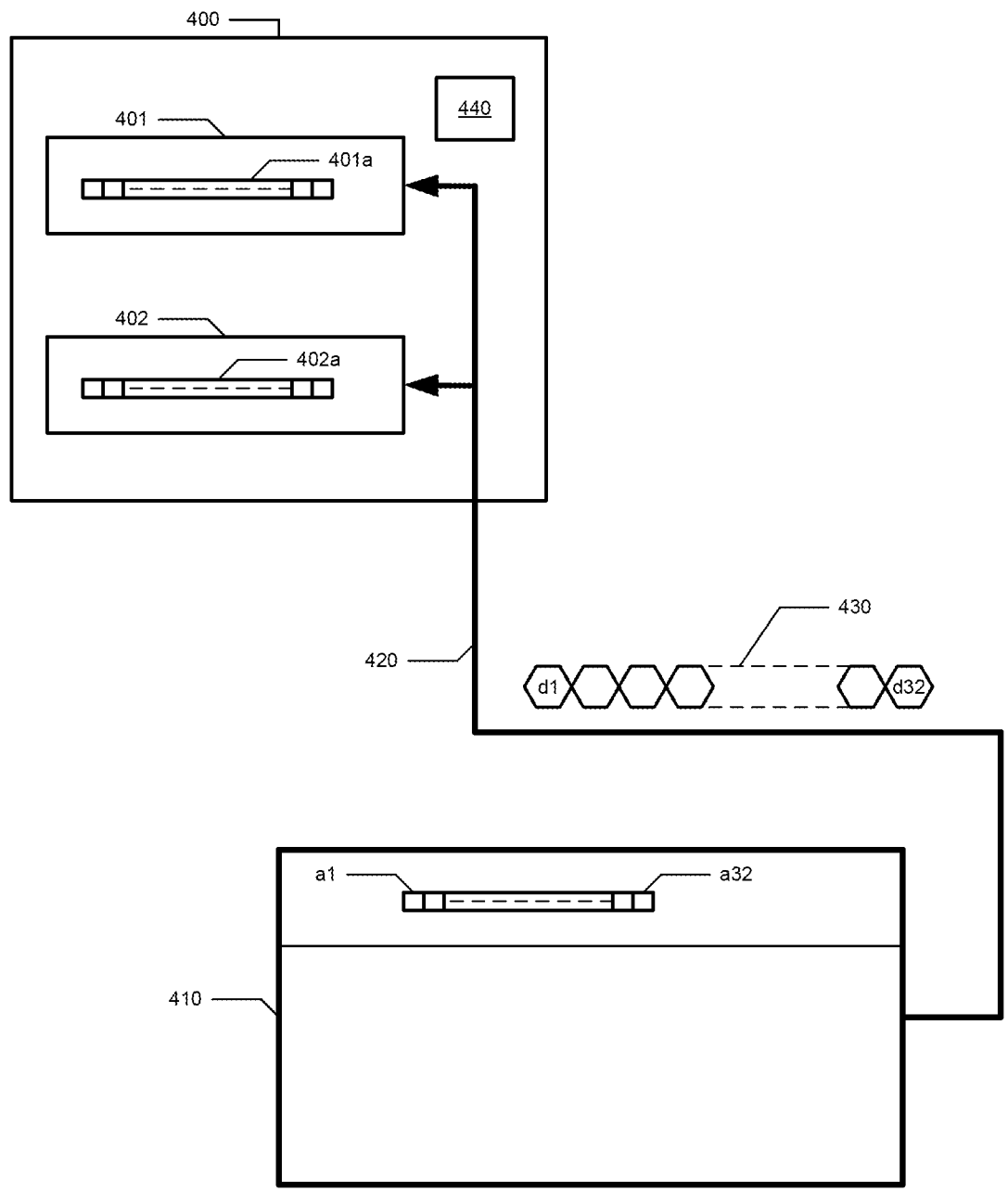
FIG. 4 is a diagram illustrating data transfer upon row signal indicating a row hit.

FIG. 4 shows the timing of data transfer between the processor 400 and DRAM 410 along the data bus 420 when the ROW HIT/MISS signal is a hit which is the same bus timing as in a conventional system. The processor 400 needs to transfer the whole block in DRAM 410 to the L1 and L2 caches. Here, the L1 cache 401 includes block 401a and L2 cache 402 includes block 402a. The block size shown in DRAM 410 is assumed to be 32 words and takes 32 bus cycles 430 to complete the data transfer along data bus 420. The register file 440 is described further in regard to FIG. 5.

Figure 5:
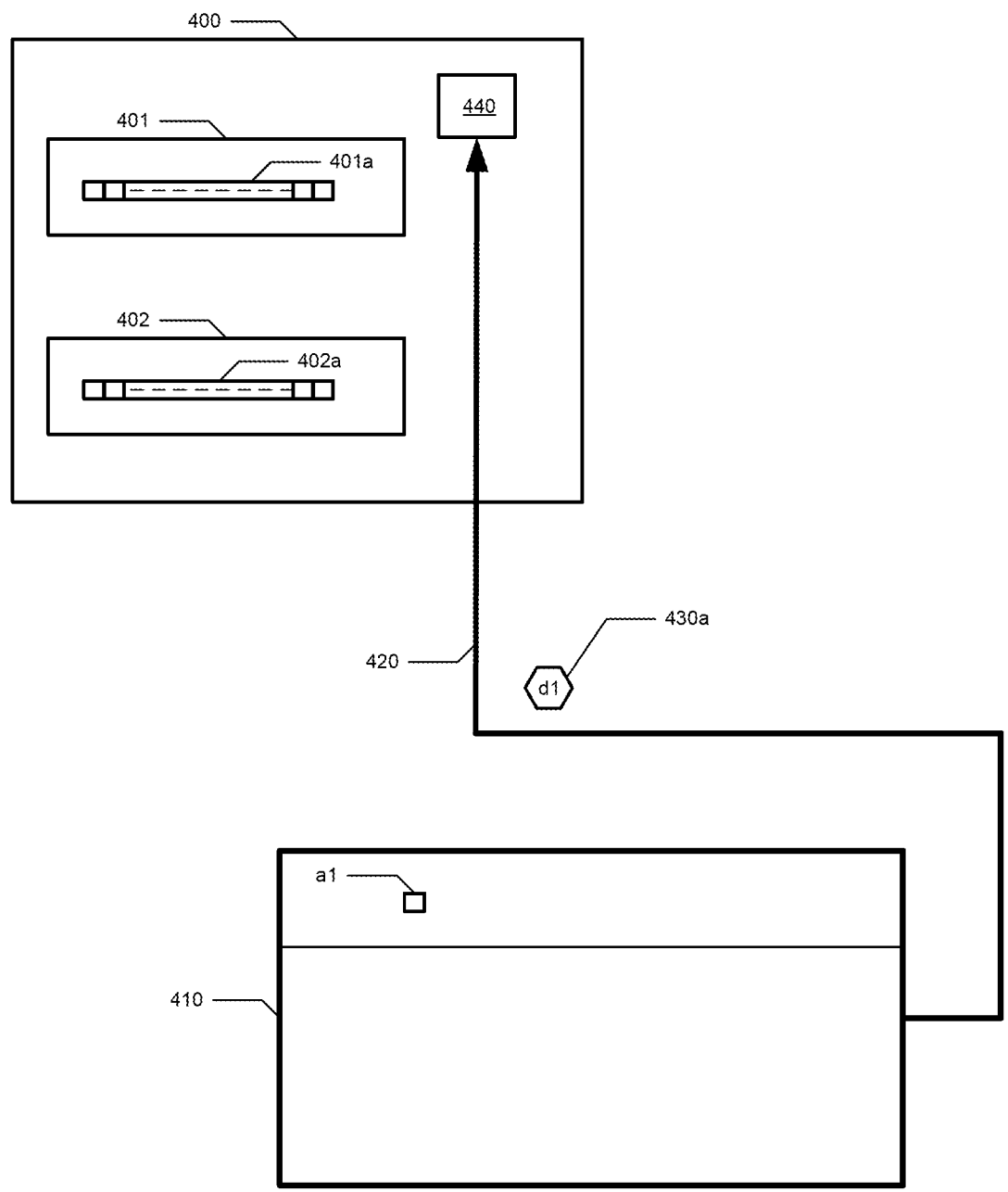
FIG. 5 is a diagram illustrating data transfer upon row signal indicating a row miss.

FIG. 5 shows the timing of data transfer 430a when the ROW HIT/MISS signal is a miss and the processor 400 needs to transfer only the requested word to the register file 440. The word takes one bus cycle.

Figure 6:
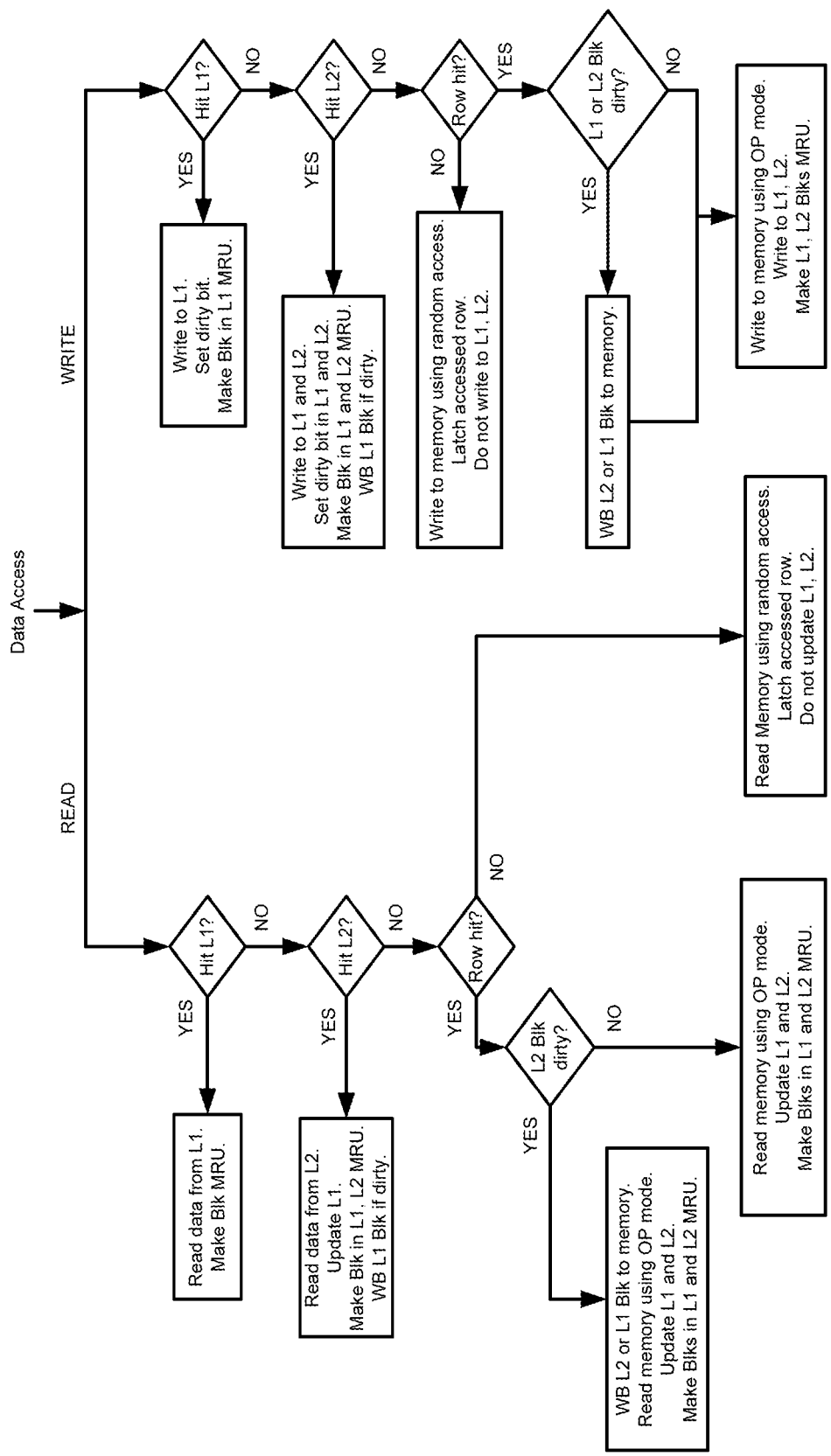
FIG. 6 is a flowchart illustrating an embodiment of the cache filtering method in accordance with an embodiment of the present invention.

FIG. 6 shows a flow chart of the cache filtering method in accordance with embodiments of the present invention. In general, a cache miss will occur with either a row hit or a row miss. In a cache miss to L1 and L2 and if the memory reference generates a row miss, the present method accesses data in the DRAM using random access mode and latches the accessed row. This represents the first use of an address and the method transfers data only to the register file. In a cache miss to L1 and L2 and if the memory reference generates a row hit, the method accesses the DRAM using open page mode and updates L1, L2 cache by transferring a whole block of data and keeps the row active. In operation, the data access will be either a READ access or a WRITE access.

In the instance of a READ access as shown, the method initially determines whether L1 is a hit. If so, then the data will be read from L1 and the block will be rendered as Most Recently Used (MRU). If not, then the method will determine whether L2 is a hit. If so, then the data will be read from L2, L1 will be updated, the L1 and L2 blocks will be made MRU, and a Write Back (WB) of the L1 block will occur if the block is dirty—i.e., if the block in cache has been modified by the processor, but not yet written back to storage. If L2 is not determined to be a hit, then the method will determine whether the hit is a row hit. If so, then the L2 block is checked whereupon a dirty L2 block will cause a WB of L2 or L1 to memory, a reading of memory using open page (OP) mode, an updating of L1 and L2, and making the blocks in L1 and L2 MRU. If the L2 block is not dirty, then memory is read using open page mode, L1 and L2 are updated, and the L1 and L2 block are made MRU. If L2 is not determined to be a hit and the method determines there is not a row hit, then memory will be read using random access transferring only a single word and the accessed row will be latched in the row latch. L1 and L2 are not updated.

In the instance of a WRITE access, the method initially determines whether L1 is a hit. If so, then the data will be written to L1, the dirty bit will be set, and the block in L1 will be made MRU. If not, then the method will determine whether L2 is a hit. If so, then the data will be written to L1 and L2, the dirty bit in L1 and L2 will be set, and the L1 and L2 blocks will be made MRU. If L2 is determined not to be a hit, then the method will determine whether the access is a row hit. If not, then memory is written to using random access transferring only a single word, the accessed row is latched in the row latch, and L1 and L2 are not written to. If the access is a row hit and the L1 or L2 blocks are dirty, then the L2 or L1 blocks are written back to memory, then memory is written using open page mode, the L1 and L2 blocks are written to, and the L1 and L2 blocks made MRU. If the L1 or L2 blocks are not dirty, then memory is written using open page mode, the L1 and L2 blocks are written to, and the L1 and L2 blocks are made MRU.

Alternative embodiments of the present invention are possible such that the method is optimized for different systems based on given system capabilities and the application requirements. Some systems may use more than two levels of cache or use different DRAM access policies such as a closed page policy, whereas still other applications may change their behavior at run time such as turning static selection of the filtered regions in the DRAM into a varying selection. To make the cache filtering method and apparatus in accordance with embodiments of the present invention optimized and suitable for such varied requirements, modifications of the embodiments in two ways is contemplated.

Firstly, embodiments of the present invention may be modified in terms of selecting DRAM regions for filtering. A modification is made to increase the number of frequently used regions in each DRAM bank. The method described earlier has only one active row or region per each bank. Each row is a linear array of consecutive addresses. The modifications allows non-consecutive accesses in each bank to be used as frequently-used regions. Many applications have more than one active area being accessed in the same bank and therefore their data needs to be transferred to the cache.

Secondly, embodiments of the present invention may be modified in terms of cache filter selection. In particular, the embodiments may be modified to be able to select a specific cache level or combinations of caches in the processor to reject less frequently used references from them. For example, the method could have the L1 data cache reject less frequently used accesses while the other levels accept them. The detailed descriptions of these alternative embodiments will now be further detailed hereinbelow.

In accordance with a further embodiment of the present invention, a multiple active region variation is contemplated. In particular, in order to improve the selectivity of the previously described cache filtering method, two partial rows in each bank are selected for storage in the row latch. In the previously described method, only one row per bank is latched and each time an access goes to a different row in the same bank, the previously latched row must be replaced by the new one. In many applications, more than one area in the same bank can be active and must therefore be transferred to the cache. Multiple row latching allows the cache to be updated from more than one row in each bank. This makes the filtering more selective in rejecting less frequently used references and reduces the probability of rejecting accesses to an active DRAM area. In terms of the present description, "active" means that the processor still visits this area and accesses its data.

Figure 7:
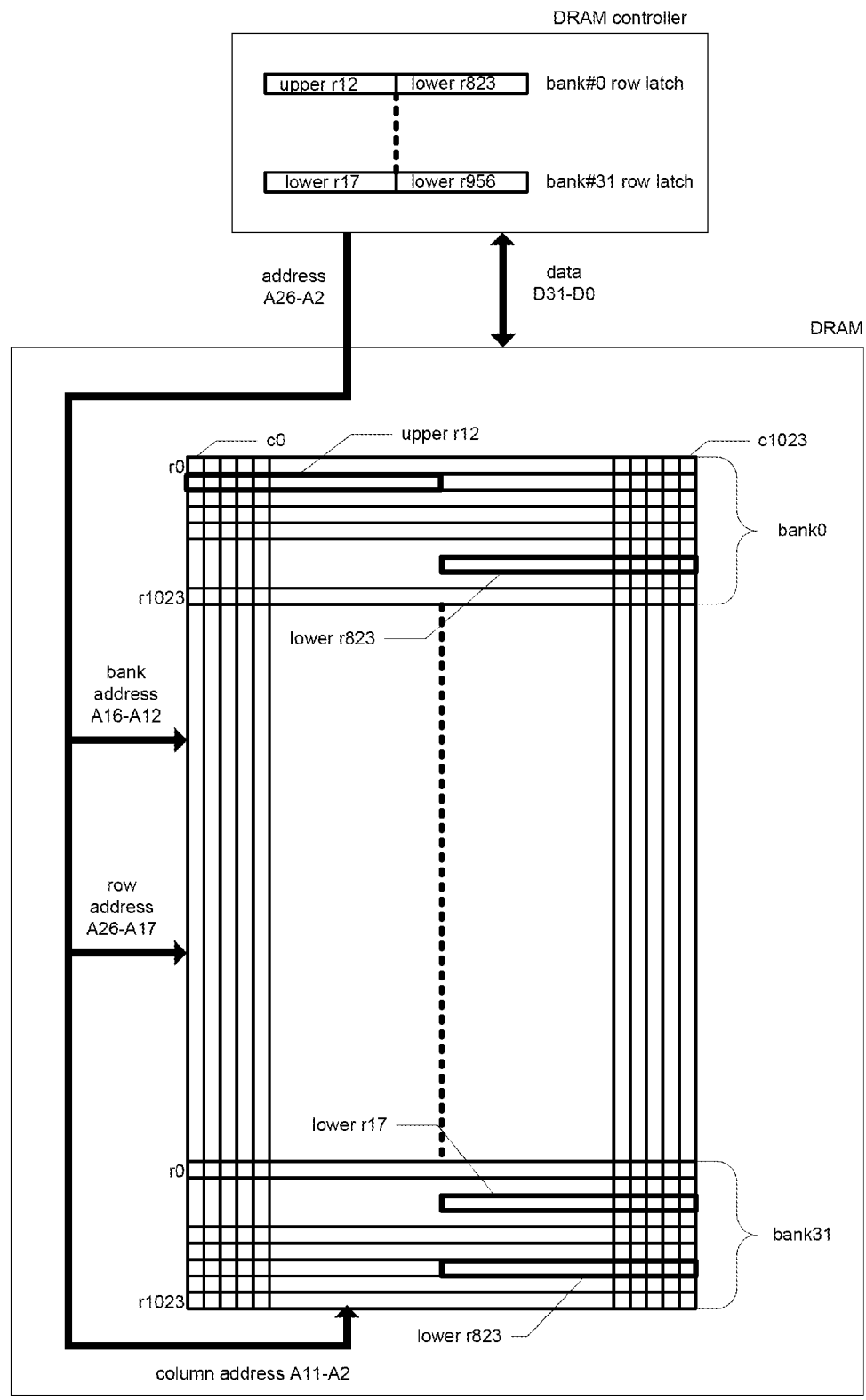
FIG. 7 is an illustration of a system having multiple active partial rows within a given bank and within the system an embodiment of the present invention is applicable.

FIG. 7 shows a system that uses latches for multiple active partial rows in each bank. It should be noted that the DRAM banks do not need to use an open page policy to have the latches in the DRAM controller store one or more row address. Each access to the DRAM bank has a specific row address that can be stored in the corresponding latch in the DRAM controller.

Still with reference to FIG. 7, the latches of each bank store two partial rows. Each partial row is one half of the whole row and, in the illustrated example, have only 512 columns (e.g., upper r12, lower r823). The size of each latch is twice the size of the latch needed to store one row address, with two additional bits for storing A11. Address A11 determines whether the upper half or the lower half of the row is selected. Further, the bank0 latch stores upper row12 and lower row823, whereas the bank31 latch stores lower row17 and lower row956. This effectively means any access to these partial rows of these banks will be allowed in the cache.

Figure 8:
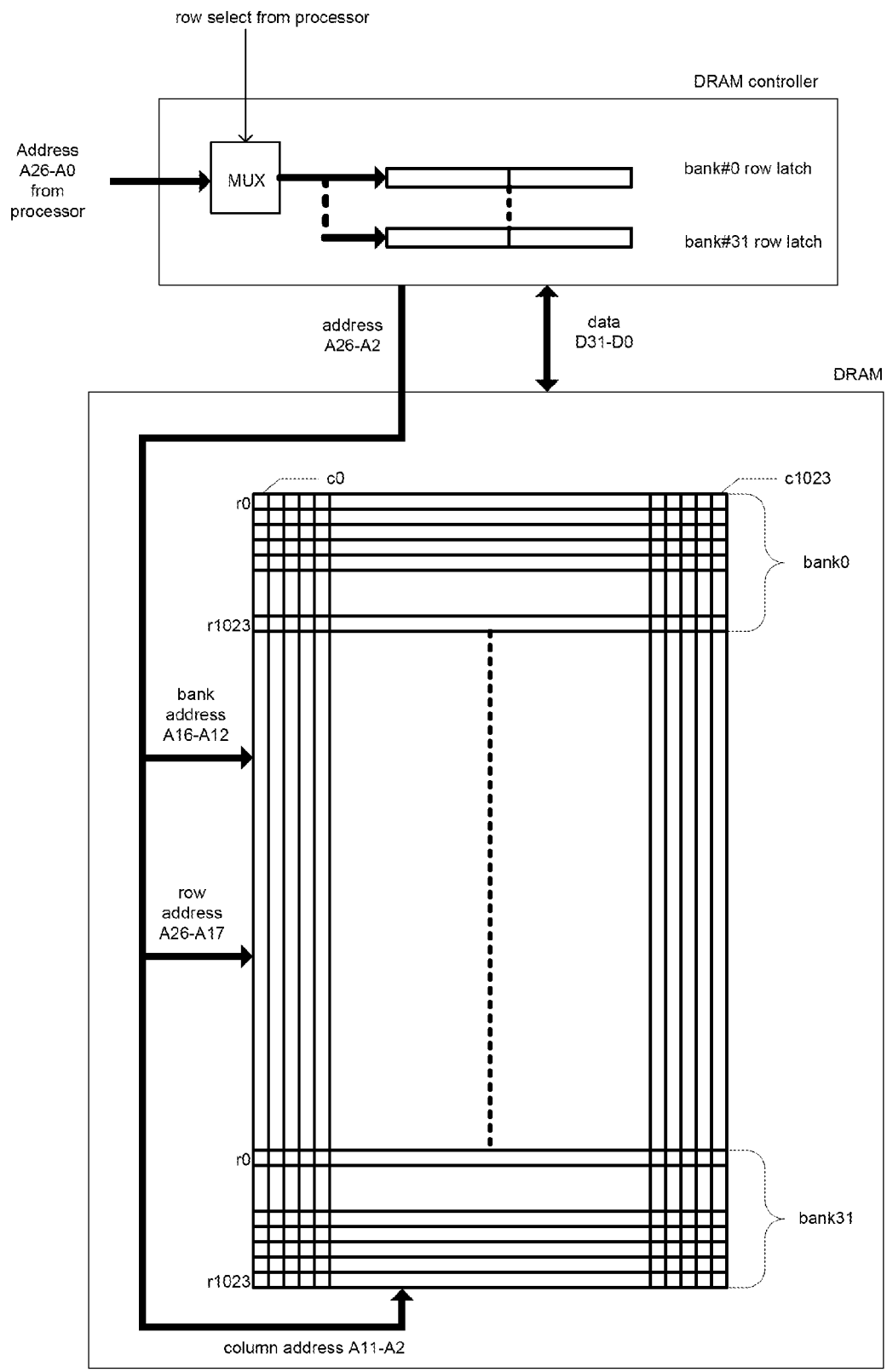
FIG. 8 is an illustration similar to FIG. 7, but where the system involves an adaptable regions variation.

In accordance with still a further embodiment of the present invention, and with regard to FIG. 8 an adaptable regions variation is contemplated. FIG. 8 shows a block diagram of an adaptable regions variation. In this embodiment, the addresses in row latches are allowed to change based on a row select signal from the processor and a multiplexer that has the whole address of the processor as an input (A31 through A0). This allows the active region to be defined anywhere within the bank array. For example, if the processor select signal selects A11-A2 to be stored in the row latches, then any access that has A11-A2 address the same as the latched A11-A2 will be considered as an active access. This region is a vertical array of memory locations in the DRAM bank.

To explain with another example, assume the processor passes through mux the latched address to be: A24 to A17, and A11, A10 (10 BITS). Here, A26, A25 of row address are replaced with column address A11, A10. Assuming further that the processor initializes this address to 0 by making a false access to an address where A24-A17, A11, A10=0. Being obtained by having all possible values for the remainder of addresses A26, A25, A9-A2, the following locations will be accepted in cache:

1-ROW#0 CL255 . . . CL0 (A26, A25=00)
2-ROW#256 CL255 to CL0 (A26, A25=01)
3-ROW#512 CL255 to CL0 of ROW#512 (A26, A25=10)
4-ROW#768 CL255 to CL0 of ROW#768 (A26, A25=11)

The adaptable regions variation is able to select any area in the DRAM bank from one horizontal array (i.e., row) to one vertical array (i.e., one column different rows) as needed by the application. The block diagram in FIG. 8 also illustrates that each latch is able to store two regions which can take any row/column size or organization based on the select signals. Other variations in this embodiment could provide that more than two regions be stored in each bank latch. It should be readily apparent that the number of active regions and the size of each active region depends upon, and may vary with, the given application and system architecture without straying from the intended scope of embodiments of the present invention.

Figure 9:
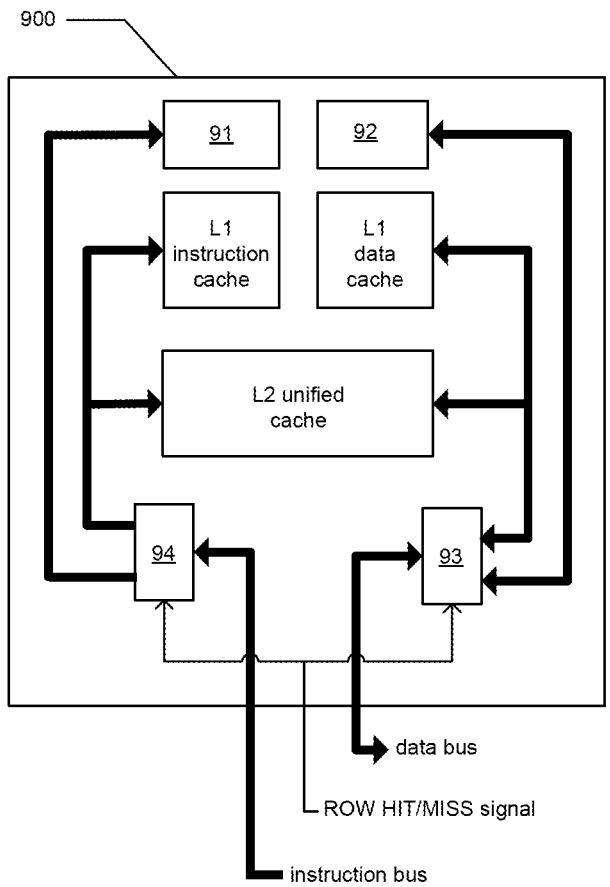
FIG. 9 is a block diagram illustrating another embodiment of the present invention in terms of instruction and data caches.

In accordance with a further variation, an alternative embodiment of the invention will be described with regard to FIG. 9 in terms of instruction and data caches within a processor 900. FIG. 9 shows a block diagram of an inventive cache filter used to reject less frequently used references from both instruction and data caches. Here, the processor 900 uses one demultiplexer 93 for data caches and one demultiplexer 94 for instruction caches. Rejected accesses from instruction caches are stored in the instruction register 91 and take one bus cycle. As before, when the ROW HIT/MISS signal is a miss the processor 900 needs to transfer only the requested word to the register file 92.

Figure 10:
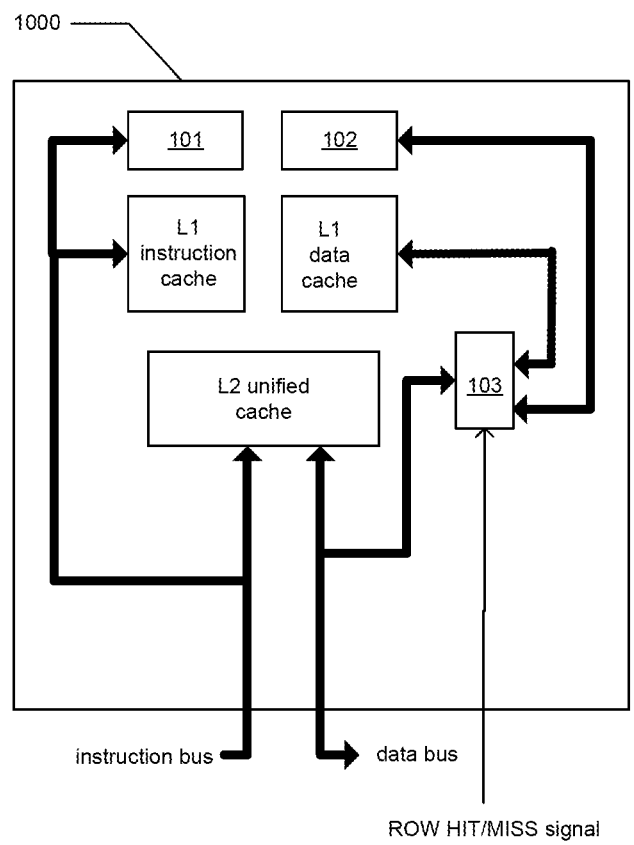
FIG. 10 is a block diagram illustrating still another embodiment of the present invention in terms of L1 data caches.
Figure 11:
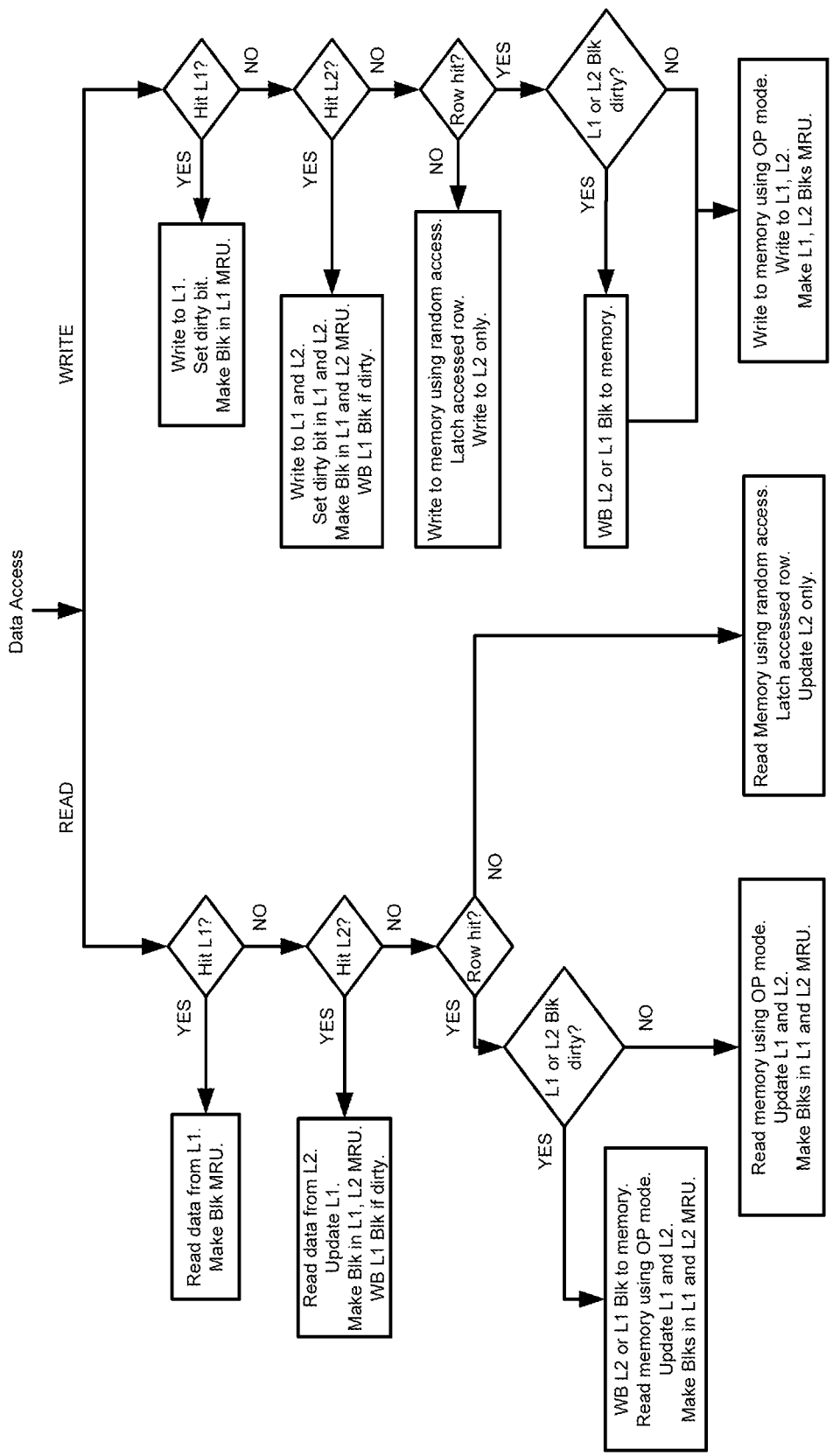
FIG. 11 is a flowchart illustrating the embodiment of the cache filtering method in accordance with FIG. 10.

In accordance with still another variation, an alternative embodiment of the invention will be described with regard to FIG. 10 in terms of L1 data caches. FIG. 10 shows a block diagram of a cache filter scheme used to reject less frequently used references from L1 data cache only. Here, the processor 1000 uses the demultiplexer 103 for the L1 data cache to reject or accept data from the DRAM into the L1 data cache. Rejected accesses from L1 cache are stored in the register file 102. FIG. 11 shows a flow chart of memory data accessing for this variation. FIG. 11 differs from the embodiment of invention shown in FIG. 6 in that upon a row miss, the method updates the L2 cache with a block of data and does not allow data to be stored in the L1 data cache.

In all of the above mentioned various embodiments, the DRAM access policy can be an open page policy or a closed page policy. Moreover, the latching of selected regions in each bank is not dependent on the DRAM access mode used.

Figure 12:
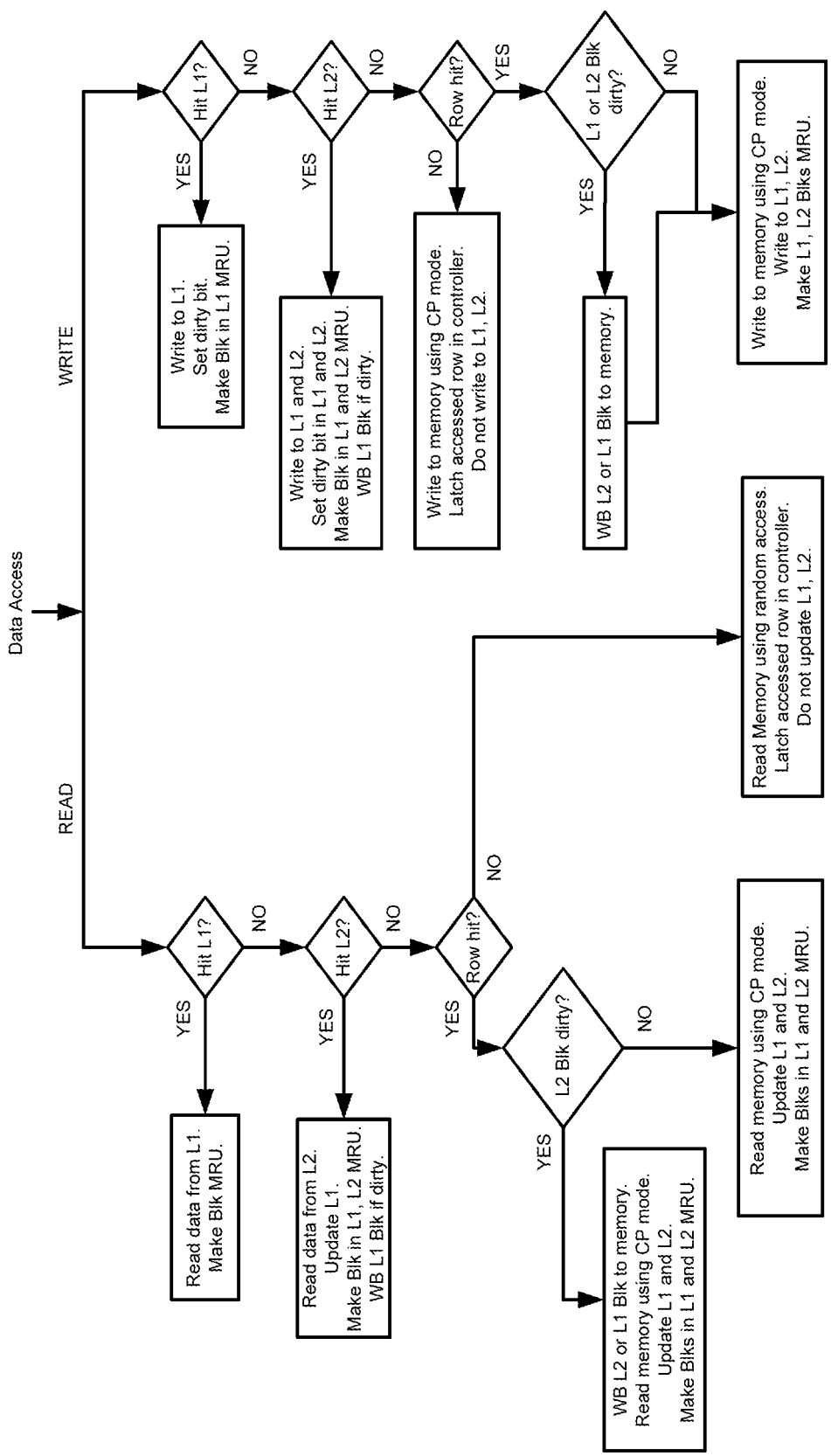
FIG. 12 is a flowchart illustrating another embodiment of the cache filtering method in accordance closed page DRAM policy.

In accordance with yet another variation, an alternative embodiment of the invention will be described with regard to FIG. 12 in terms of an inventive cache filter that uses a closed page DRAM policy. Here, FIG. 12 differs from the embodiment of the invention shown in FIG. 6 in that the row hit signal does not indicate that a DRAM open page is used. Rather, the row hit signal means that the latched address of the accessed region is active and was used before. It should be noted that here Closed Page (CP) mode is used in both row hit and row miss conditions.

In operation, an embodiment of the present invention was applied using SPEC2000™ benchmark traces that were collected from a real system to analyze the frequency of use of memory addresses in applications. SPEC2000™ benchmark traces are a standardized set of relevant benchmarks that can be applied to the newest generation of high-performance computers. Such traces are set by the Standard Performance Evaluation Corporation (SPEC) which is a non-profit corporation formed to establish, maintain, and endorse SPEC benchmark suites.

Utilizing the traces, the number of addresses in each application was counted and the frequency of their use was divided between addresses used for one time or more and addresses used for two times or more. To explain the frequency of use of addresses, the following addresses are assumed to be accessed in the order they are listed: A1, A13, A2, A1, A55, A23, A13, A39, A13, A7, A13, A1, A11, A22, A13, A1, A11, A13, A39, A1. The number of addresses that are used one time or more=9 which are: A1, A13, A2, A55, A23, A39, A7, A11, A22 and are used for 20 times. The number of addresses that are used two times or more=4 which are: A1, A13, A11, A39 and used for 15 times.

Figure 13:
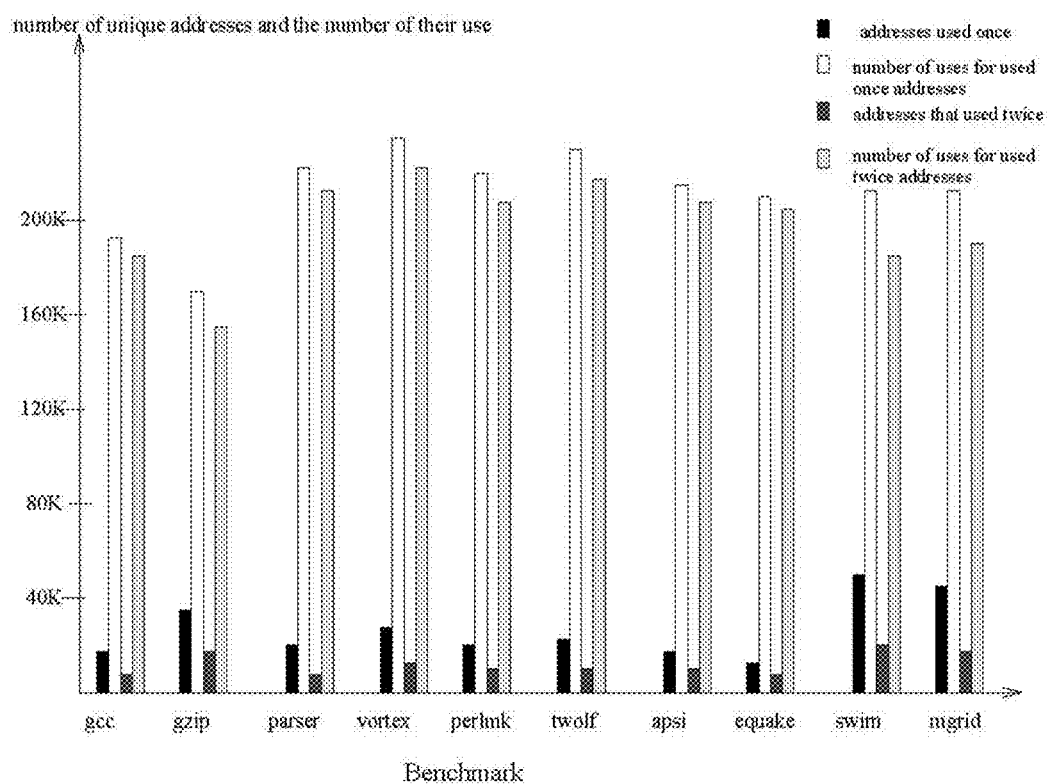
FIG. 13 is a graphical illustration of benchmark traces versus their address usage averages.

FIG. 13 shows the average number of addresses in 10 benchmarks and the frequency of their use. A 0.5 million reference sample was selected from each of the traces of theses applications. The size of the sample was selected to simplify the search. It was also found that a sample size of more than 0.5 million references did not have significant effect upon the statistics. The following traces from SPEC2000™ benchmarks were used: gcc, gzip, parser, vortex, perlmk, twolf, apsi, equake, swim, and mgrid. From the results shown in FIG. 13, it was established that: 1) The addresses have very high frequency of use such that the average number of the addresses for all traces that are used one time or more was equal to 27,036 and are used for 212,390 times, where the average use for each address was=7.8; and 2) the average number of addresses used two times or more for all traces was equal to 13,120 and used for 198,474 times, where the average usage for each address was=15.12.

In evaluating performance, a conventional system using a modern processor and DRAM was compared against a second system using the same processor and DRAM with the inventive cache filtering method applied. The processor and DRAM parameters for the two systems shown below in TABLE 1. The parameters were selected to represent typical values used in a modern computer system.

TABLE 1

| Component | Value |
|---|---|
| Processor speed: | 3.3 GHz |
| L1 Instruction cache: | 32 Kbytes, 4-way, 64 byte block, access time = 0.3 ns. |
| L1 Data cache: | 32 Kbytes, 4-way, 64 byte block, access time = 0.6 ns. |
| L2 cache: | unified, 1 Mbytes, 8-way, 128 byte block, access time = 3.6 ns. |
| Memory Processor Bus: | 8 byte width, 500 MHz speed. |
| DRAM: | 32-banks, 4 Kbyte row-buffer, page interleaving, open page policy. |
| DRAM timing: | open-page (row-buffer hit) = 50 ns, row conflict = 100 ns. |

A simple trace-driven simulator was used with SPEC2000™ traces to model a multi-level cache system and DRAM with multiple banks. The simulator calculated the average time per each access by adding the cost, in time, for each access based on the type of operation and the cost of operation in the different memory levels. More specifically, the DRAM consisted of a number of banks interleaved around a DRAM page of 4 Kbyte size where each bank latched a specific row that consisted of 4096 column locations. Any access that maps the same row gives a row hit and is accessed in 50 ns while a row miss is accessed in 100 ns.

The simulator followed the method shown in FIG. 6 to simulate application of an embodiment of the present invention within a given processor and DRAM. The results are shown in FIG. 14 which illustrates the miss rate of L1 data cache for a conventional system and a system with the present inventive cache filtering applied.

Figure 14:
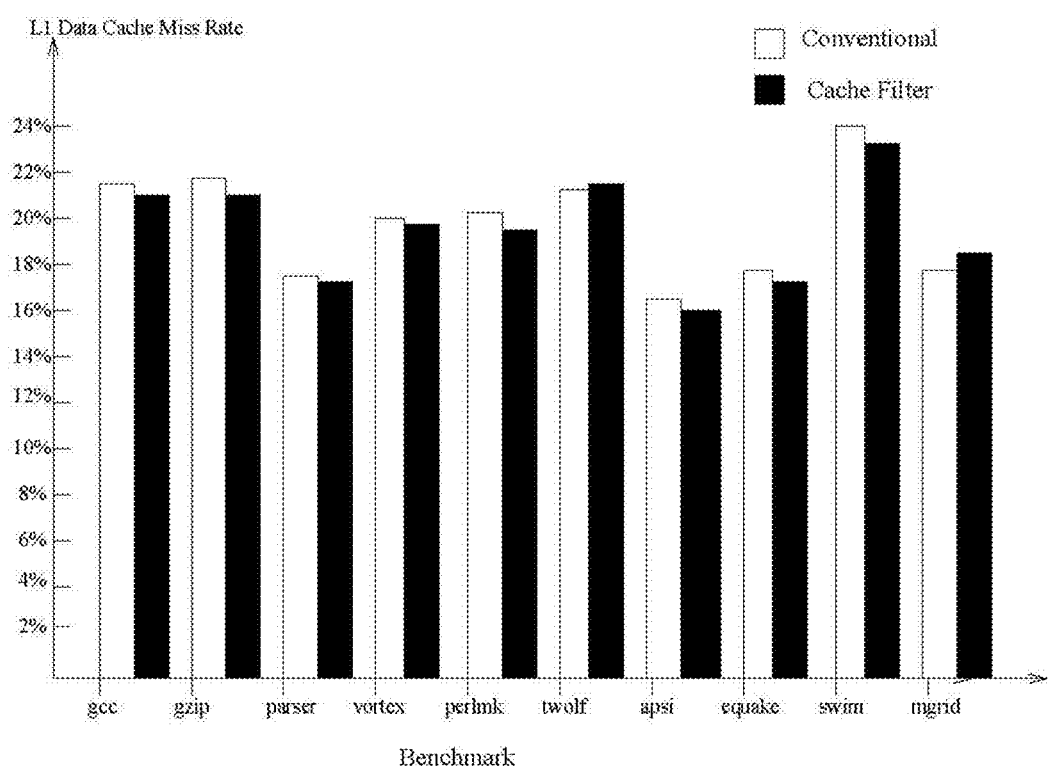
FIG. 14 is a comparative graphical illustration of L1 miss rate for the benchmark traces identified in FIG. 13 and used within a conventional system as compared to a system using a cache filtering in accordance with an embodiment of the present invention.

From the graphical illustration of FIG. 14, it can be seen that the cache filtering in accordance with an embodiment of the present invention improves L1 data cache miss rate by an average of 2%. The embodiment of present invention helps L1 miss rate although it prevents first time accesses from being transferred to the cache. This is compensated for by the present invention rejecting the once-used references that would otherwise compete with other blocks and evict them. The embodiment of the present invention was not applied to the instruction cache on the assumption that most instructions have high localities and very few instructions are suitable for rejection. Thus the embodiment of the present invention would have limited benefit to instruction cache performance under this assumption.

Figure 15:
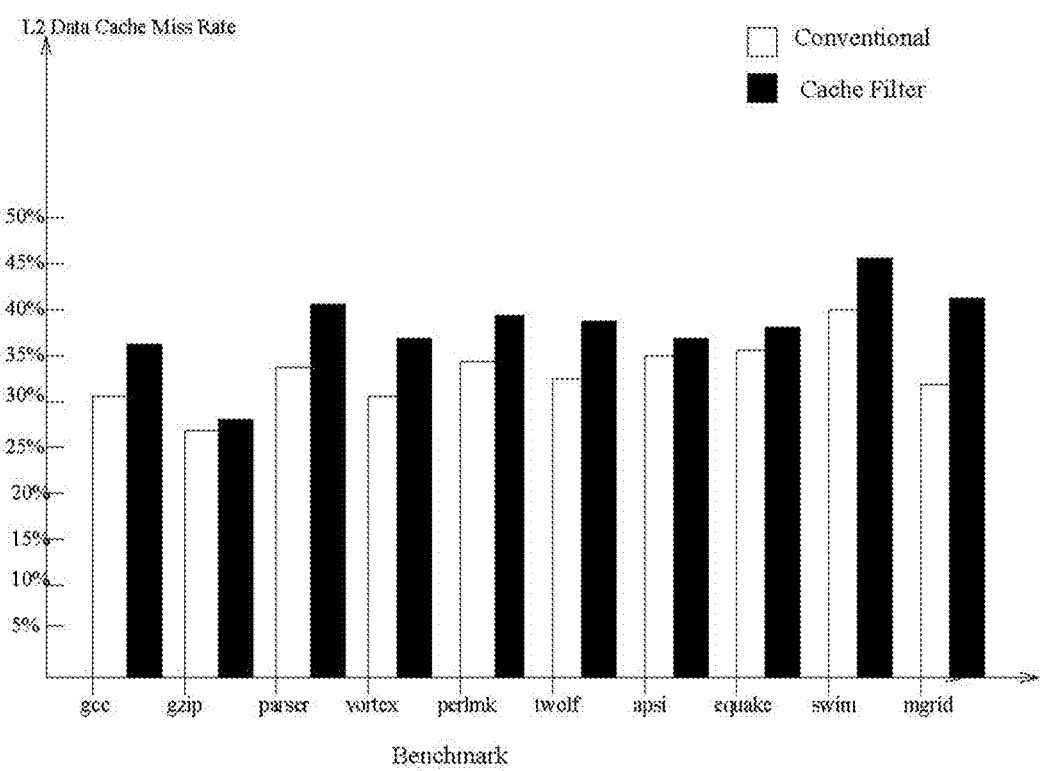
FIG. 15 is a comparative graphical illustration of L2 miss rate for the benchmark traces identified in FIG. 13 and used within a conventional system as compared to a system using a cache filtering in accordance with an embodiment of the present invention.

FIG. 15 graphically illustrates the data miss rate of the L2 cache for a conventional system versus a system with an embodiment of the present invention applied. Here, it is shown that the inventive cache filtering increases the L2 data miss rate by 17% on average due to rejecting accesses of first time use. The cache filter gains from reducing the eviction rate and the number of write back operations as illustrated below by TABLE 2 in number of references to DRAM.

TABLE 2

| Trace | Conventional | Cache Filter |
|---|---|---|
| gcc: | 503,074 | 505,755 |
| gzip: | 331,642 | 266,907 |
| parser: | 381,286 | 379,327 |
| vortex: | 607,004 | 603,903 |
| perlmk: | 494,767 | 481,144 |
| twolf: | 488,881 | 516,329 |
| apsi: | 398,304 | 380,816 |
| equake: | 373,932 | 356,196 |
| swim: | 540,008 | 574,946 |
| mgrid: | 440,030 | 487,450 |

TABLE 2 shows the total number of DRAM references in the system with the inventive cache filter applied versus a conventional cache system. DRAM references are generated from the cache misses in L1 and L2 for instructions and data plus the write back operations. The reductions in the eviction rate and the number of write back operations helps to compensate for the increase in L2 miss rate. Furthermore, the conventional system must transfer the whole block (i.e., 128 Byte) to the processor each time there is an L2 miss. The inventive cache filter transfers 1 word (i.e., 8 Byte) to the processor upon a row miss and transfers the whole L2 block only upon a row hit.

Although the number of DRAM references in the system with the inventive cache filter applied is, on average, the same as the number of DRAM references in the conventional system, the L2 cache miss rate of the conventional system is lower than the L2 miss rate of the cache with an embodiment of the present invention applied. All cache misses generated from rejecting used once references in the cache with an embodiment of the present invention applied do not evict any blocks. This reduces the number of write back operations in the inventive cache filter and compensates for the difference in L2 miss rate.

Figure 16:
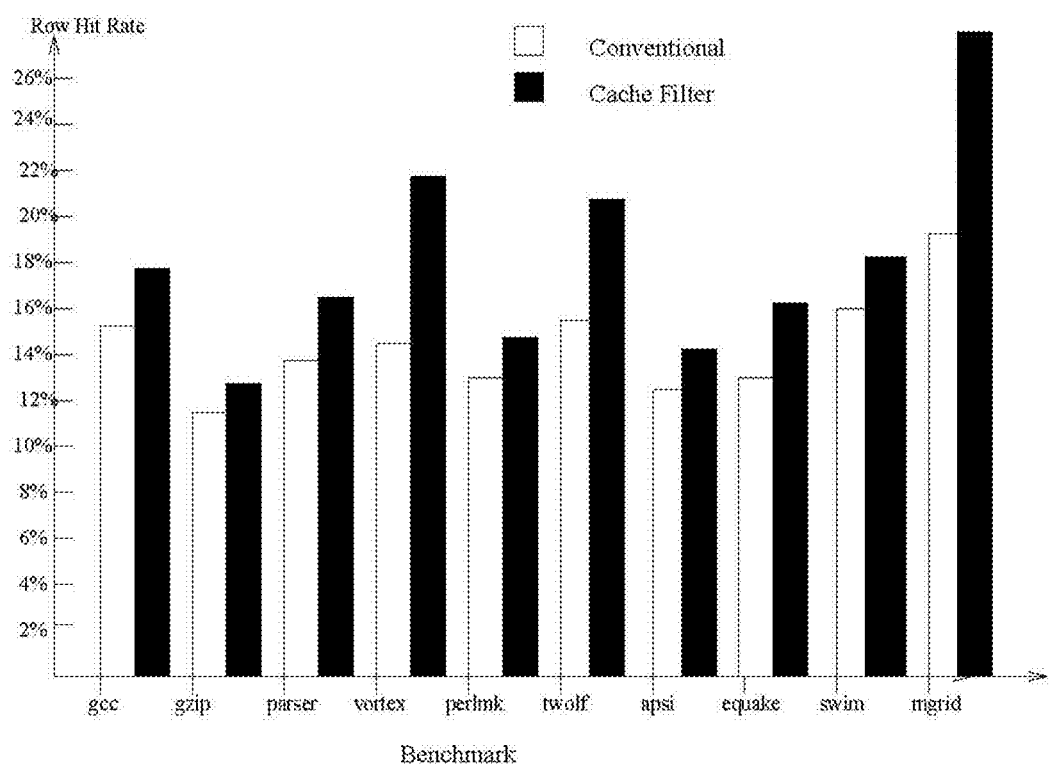
FIG. 16 is a comparative graphical illustration of DRAM row hit rate for the benchmark traces identified in FIG. 13 and used within a conventional system as compared to a system using a cache filtering in accordance with an embodiment of the present invention.

With regard to FIG. 16, the row hit rate for each given benchmark trace is shown for both the conventional system and the system having a cache filter in accordance with an embodiment of the present invention. The results illustrate that the cache filtering in accordance with the embodiment improves row hit rate by up to 50% and by 24% on average. The effect of intercepting caches on row hit rate was evaluated and revealed that caches intercept accesses to the DRAM, make them more scattered, and reduce the row hit rate. This means that a higher L2 miss rate forces the system to access the DRAM more often and helps to keep the DRAM rows active for a longer time.

Figure 17:
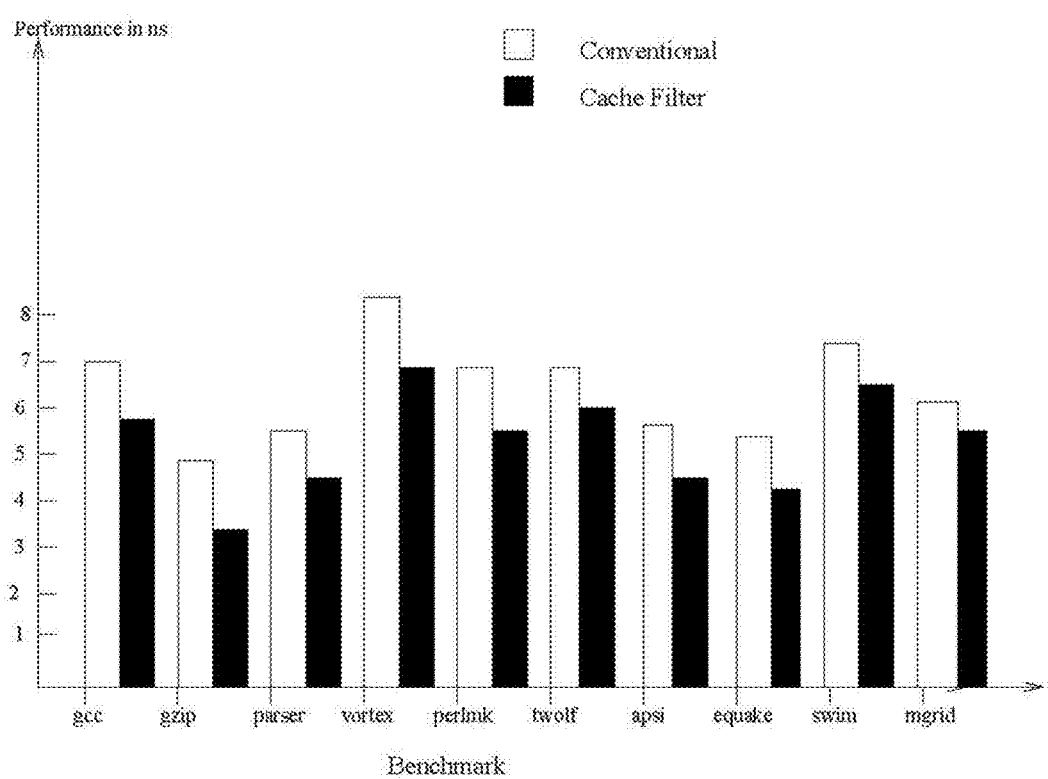
FIG. 17 is a comparative graphical illustration of performance for the benchmark traces identified in FIG. 13 and used within a conventional system as compared to a system using a cache filtering in accordance with an embodiment of the present invention.

The relative performance between the conventional system and the system having a cache filter in accordance with an embodiment of the present invention is shown by way of FIG. 17. Performance here was defined as the average time (ns) per an access in any level (i.e., L1, L2). Across the benchmark traces, the cache filter in accordance with an embodiment of the present invention improved system performance by up to 44% and by 22% on average as compared to the conventional system. This gain is attributable both to the reduction in transfer time of the cache blocks from the DRAM for rejected blocks as well as to the improvement in row hit rate.

Figure 18:
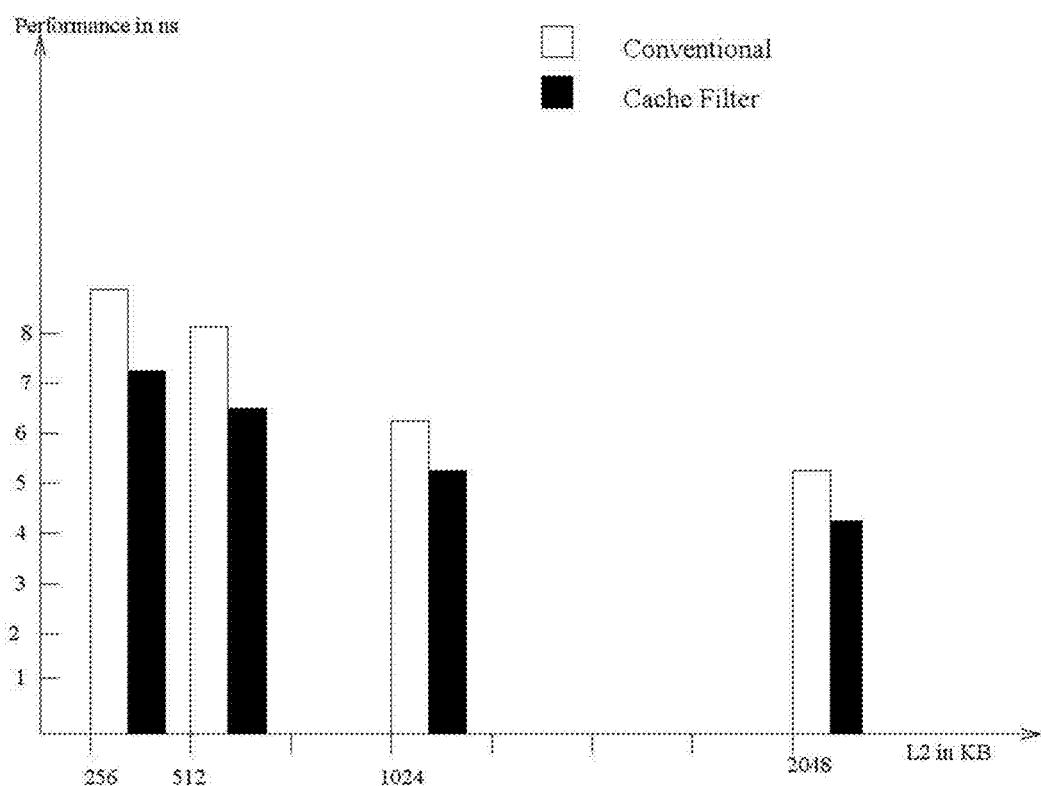
FIG. 18 is a comparative graphical illustration of performance for the benchmark traces identified in FIG. 13 averaged within differing L2 cache sizes and used within a conventional system as compared to a system using a cache filtering in accordance with an embodiment of the present invention.

Performance was also assessed for the benchmark traces with regard to differing L2 caches sizes and such is illustrated by way of FIG. 18. Here, the average performance of the ten benchmark traces is shown for four different cache sizes (i.e., 256 KB, 512 KB, 1024, KB, and 2048 KB) repeated for the conventional system as compared to the system having a cache filter in accordance with an embodiment of the present invention. The performance of a system using the inventive cache filter can be seen to be equivalent to the performance of a conventional system that uses an L2 cache of doubled size. For example, the average performance of the inventive cache filter using an L2 cache size of 1 MByte was 5.21 ns, whereas the average performance of a conventional system using an L2 cache size of 2 MByte was 5.19 ns. On average, the inventive cache filter improves performance by 22% for the different L2 cache sizes shown. This effectively demonstrates that at least some embodiments of the present invention are scalable with increases in L2 cache size, thereby being well-suited for future technology having larger and larger caches.

Figure 19:
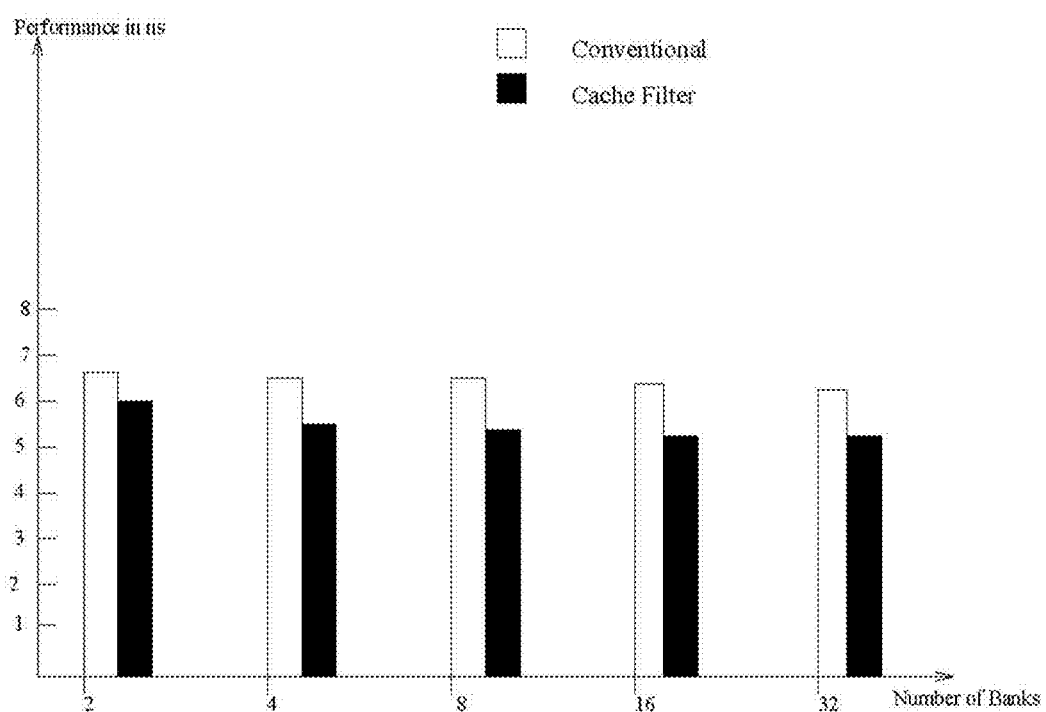
FIG. 19 is a comparative graphical illustration of performance for the benchmark traces identified in FIG. 13 averaged within differing numbers of banks and used within a conventional system as compared to a system using a cache filtering in accordance with an embodiment of the present invention.

In addition to considering increased cache size, the number of DRAM banks was increased with the performance results shown in FIG. 19. Specifically, FIG. 19 shows the average performance of the ten traces repeated using increasing multiples of DRAM banks (i.e., 2, 4, 8, 16, and 32 banks) for the conventional system compared to a system using the inventive cache filter. Here, performance of the conventional system improves by 2.8% when the number of banks changes from 2 to 32 which indicates very little dependency on the number of banks. In contrast, performance of the inventive cache filter improves by 13.6% when number of banks changes from 2 to 32 which indicates a relatively strong dependency on the number of banks. Overall, the inventive cache filter improves performance—e.g., by 19.2% compared to a conventional system when using 8 banks. Practically speaking, this suggests that most of the gain from the inventive cache filter could be achieved with a small number of banks.

Figure 20:
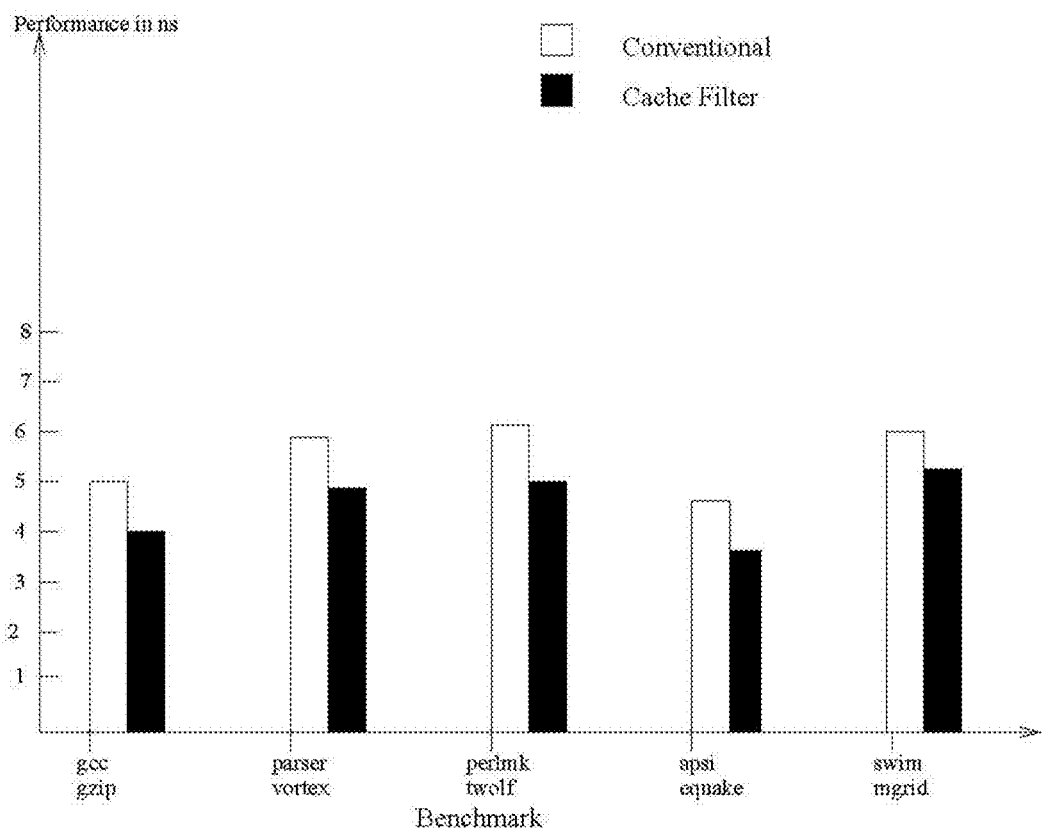
FIG. 20 is a comparative graphical illustration of performance for the benchmark traces identified in FIG. 13 interleaved in pairs and used within a conventional system as compared to a system using a cache filtering in accordance with an embodiment of the present invention.

Still further, performance was considered in terms of interleaving the benchmark traces so as to form a parallel program having multiple threads. In particular, FIG. 20 shows the average performance of five applications where each application consists of two threads that are interleaved on a single instruction. To simulate the effect of a dual core processor using a simple trace driven simulator, the size and associativity of each cache (i.e., L1 instruction, L1 data and L2) was doubled while the DRAM organization remained unchanged from that described in TABLE 1. The results graphically illustrate that the inventive cache filter improves performance by an average of 21.2% for multi-threading applications. Such improvement being consistent with the performance improvements illustrated and described by way of FIGS. 18, 19, and 20.

In general, the inventive cache filtering thus provides advantageous performance improvements of advanced processors that exhibit growing speed gaps between the processor and the DRAM as well as those applications lacking temporal and spatial localities. Such improvements being achieved without adding to the cost or complexity of the system.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of cache filtering, said method comprising:
    upon a cache miss, obtaining a row hit/miss signal associated with a bank of a main memory for a given memory reference; and
    rejecting said memory reference associated with said row hit/miss signal from the cache when said row hit/miss signal indicates a row miss.

2. The method as claimed in claim 1, further comprising transferring to memory cache said memory reference associated with said row hit/miss signal when said row hit/miss signal indicates a row hit.

3. The method as claimed in claim 2, wherein said transferring includes updating both level one cache and level two cache with said memory reference.

4. The method as claimed in claim 1, wherein a row miss signal corresponds to a first access to a location in the DRAM.

5. A method of cache filtering within a main memory, said method comprising:
    generating a row hit/miss signal associated with a bank of the main memory corresponding to a memory reference; and
    upon occurrence of level one (L1) and level two (L2) cache misses and where said row hit/miss signal indicates a row miss, accessing data in said main memory using random access mode and latching a row corresponding to said data.

6. The method as claimed in claim 5, further comprising transferring said data only to a register file.

7. The method as claimed in claim 6, further comprising, upon occurrence of L1 and L2 cache misses and where said row hit/miss signal indicates a row hit,
    accessing data in said DRAM using open page mode,
    updating L1 and L2 cache, and
    maintaining as active said row corresponding to said data.

8. The method as claimed in claim 5, wherein a row miss signal corresponds to a first access to a location in the DRAM.

9. An apparatus for data processing, said apparatus comprising:
    a main memory having a plurality of locations;
    a memory controller coupled to said main memory, said memory controller including at least one comparator for generating a row hit/miss signal corresponding to a memory reference related to one of said plurality of locations;
    at least one demultiplexer operatively coupled to said memory controller where said row hit/miss signal is used by said demultiplexer so as to route data related to said memory reference; and
    row latches for latching a row corresponding to said data.

10. The apparatus as claimed in claim 9 wherein said at least one demultiplexer is also operatively coupled to both level one (L1) and level two (L2) caches of a processor.

11. The apparatus as claimed in claim 10 further including a second demultiplexer operatively coupled to an L1 instruction cache of said processor, where said row hit/miss signal is used by said second demultiplexer so as to route instruction related to said memory reference and another row latch latches a row corresponding to an instruction row address.

12. The apparatus as claimed in claim 9 wherein said at least one demultiplexer is also operatively coupled only to level one (L1) cache of a processor and without regard to level two (L2) cache of said processor.

13. A method of cache filtering within a main memory comprising Static Random Access Memory (SRAM), said method comprising:
    generating a row hit/miss signal associated with a bank of the SRAM and corresponding to a memory reference;
    upon occurrence of level one (L1) and level two (L2) cache misses and where said row hit/miss signal indicates a row miss, accessing data in said SRAM using random access mode and latching a row corresponding to said data.

14. The method as claimed in claim 13, further comprising transferring said data only to a register file.

15. The method as claimed in claim 14, further comprising, upon occurrence of L1 and L2 cache misses and where said row hit/miss signal indicates a row hit,
    accessing data in said SRAM using open page mode,
    updating L1 and L2 cache, and
    maintaining as active said row corresponding to said data.

16. The method as claimed in claim 13, wherein a row miss signal corresponds to a first access to a location in the SRAM.

* * * * *